(12) United States Patent
Thielman

(10) Patent No.: US 11,909,904 B2
(45) Date of Patent: Feb. 20, 2024

(54) SELECTIVELY HANDSFREE COMMUNICATIONS MODULE

(71) Applicant: William Thielman, Irvine, CA (US)

(72) Inventor: William Thielman, Irvine, CA (US)

( * ) Notice: Subject to any disclaimer, the term of this patent is extended or adjusted under 35 U.S.C. 154(b) by 0 days.

(21) Appl. No.: 17/688,531

(22) Filed: Mar. 7, 2022

(65) Prior Publication Data

US 2023/0283704 A1 Sep. 7, 2023

(51) Int. Cl.
*H04M 1/60* (2006.01)
*H04W 76/10* (2018.01)
*H04W 4/48* (2018.01)

(52) U.S. Cl.
CPC ........... *H04M 1/6075* (2013.01); *H04W 4/48* (2018.02); *H04W 76/10* (2018.02)

(58) Field of Classification Search
None
See application file for complete search history.

(56) References Cited

U.S. PATENT DOCUMENTS

| | | | | |
|---|---|---|---|---|
| 4,972,457 A | * | 11/1990 | O'Sullivan | G06F 1/1616 455/418 |
| 5,548,810 A | * | 8/1996 | Riddell | H04B 1/3822 455/99 |
| 5,771,303 A | | 6/1998 | Mazzarella | |
| 6,718,187 B1 | | 4/2004 | Takagi | |
| 7,245,898 B2 | * | 7/2007 | Van Bosch | H01H 3/14 455/99 |
| 10,863,019 B2 | | 12/2020 | Pandurangarao | |
| 2017/0217311 A1 | | 8/2017 | Puchowicz | |

FOREIGN PATENT DOCUMENTS

| WO | WO9527343 | 10/1995 |
|---|---|---|
| WO | WO2005101866 | 10/2005 |

* cited by examiner

*Primary Examiner* — Frantz Bataille

(57) ABSTRACT

A selectively handsfree communications module for use in high speed pursuits includes first and second switches, which are operationally engageable to a control panel of a first radio mounted in a first vehicle and to the first radio, respectively. The first radio is equipped for two-way communication with one or both of a base station and at least one second radio of a second vehicle. The second switch is engageable to a floorboard of the first vehicle and can be actuated by a foot of an operator. Programming code, which is selectively positionable on a microprocessor of the first radio, enables the microprocessor to accept signals from the first and second switches. Switching of the first switch signals the microprocessor to operate the first radio in a handsfree operational mode, wherein a microphone and a transceiver of the first radio are actuated upon actuation of the second switch.

11 Claims, 2 Drawing Sheets

SELECTIVELY HANDSFREE COMMUNICATIONS MODULE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to communications modules and more particularly pertains to a new communications module for use in high speed pursuits. The present invention discloses a communications module comprising first and second switches, which are engageable to a control panel of a radio mounted in a vehicle and to the radio, respectively, and programming code, which is selectively positionable on a microprocessor of the radio.

(2) Description of Related Art Including Information Disclosed Under 37 CFR 1.97 and 1.98

The prior art relates to communications modules. Prior art communications modules may comprise modules having foot pedals usable for various functions, such as answering calls, muting calls, and the like, foot pedals for mechanically actuating triggers of microphones, and foot pedals for actuating transceivers. What is lacking in the prior art is communications module comprising first and second switches, which are engageable to a control panel of a radio mounted in a vehicle and to the radio, respectively, and programming code, which is selectively positionable on a microprocessor of the radio, wherein switching of the first switch signals the microprocessor to operate the radio in a handsfree operational mode.

BRIEF SUMMARY OF THE INVENTION

An embodiment of the disclosure meets the needs presented above by generally comprising a first switch and a second switch. The first switch is configured to be operationally engaged to a control panel of a first radio mounted in a first vehicle. The first radio is equipped for selective two-way communication with one or both of a base station and at least one second radio positioned in a second vehicle. The second switch is configured to be engaged to a floorboard of the first vehicle so that the second switch is positioned to be actuated by a foot of an operator of the first vehicle. The second switch is configured to be operationally engaged to the first radio. Programming code, which is selectively positionable on a microprocessor of the first radio, enables the microprocessor to accept signals from the first switch and the second switch. The first switch is configured to be switched to signal the microprocessor to operate the first radio in a handsfree operational mode, wherein a microphone and a transceiver of the first radio are actuated upon actuation of the second switch.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
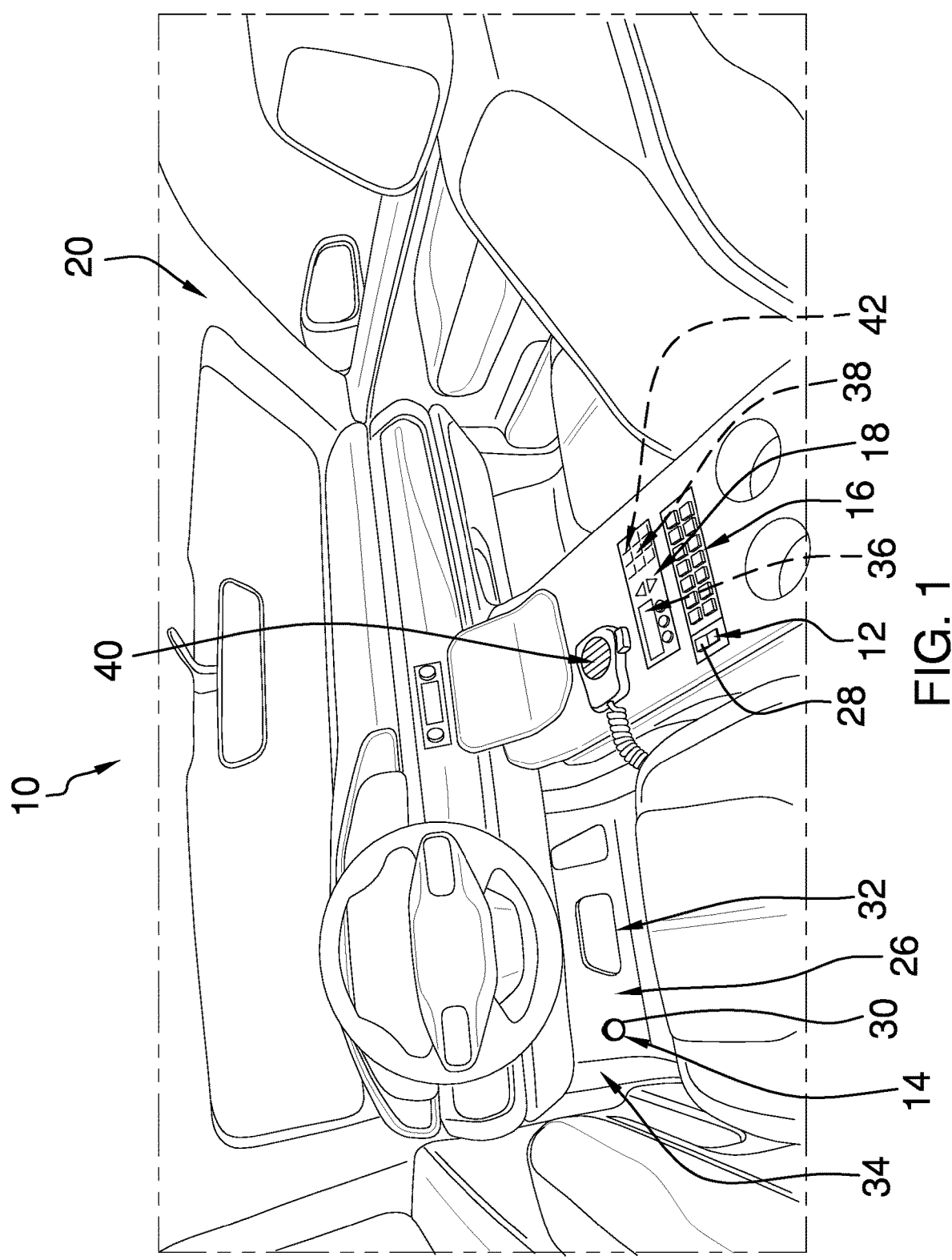
FIG. 1 is an in-use view of a selectively handsfree communications module according to an embodiment of the disclosure.
Figure 2:
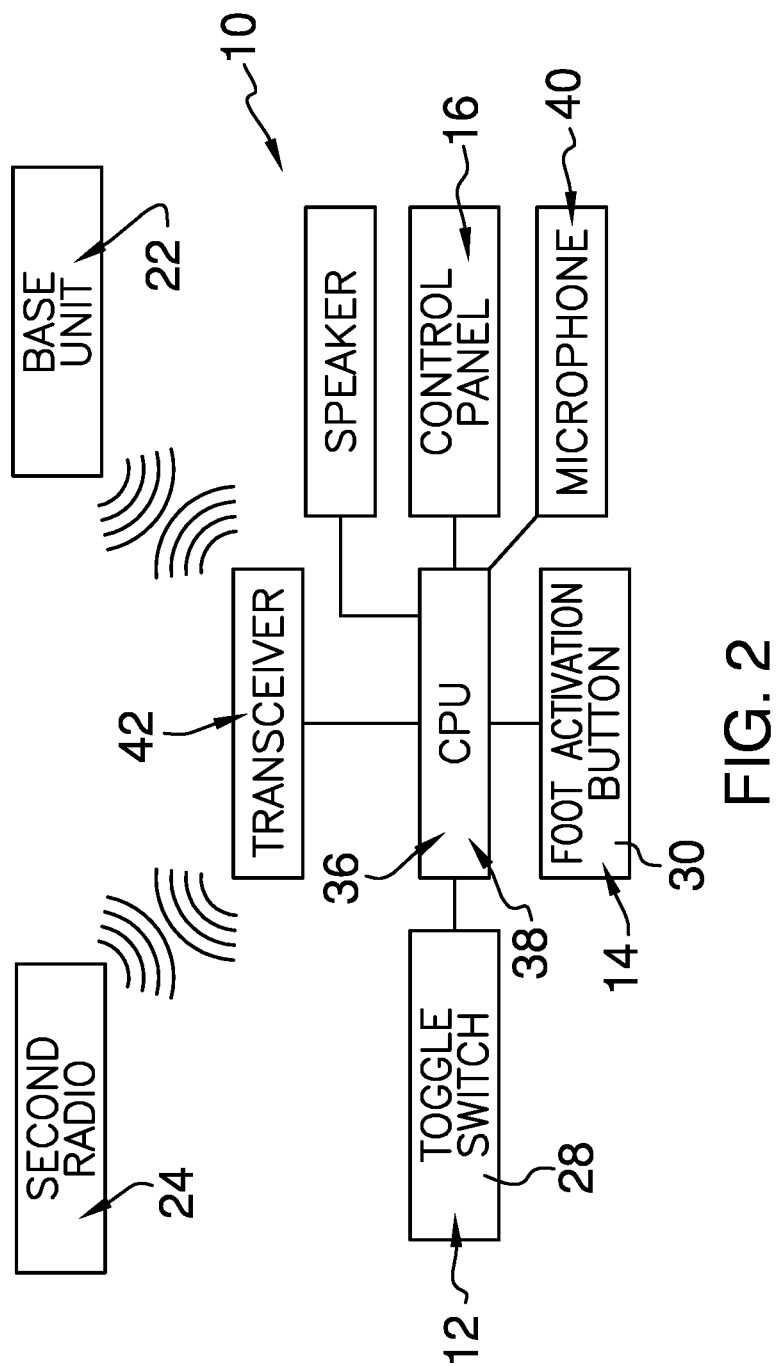
FIG. 2 is a block diagram of an embodiment of the disclosure.

With reference now to the drawings, and in particular to FIGS. 1 through 2 thereof, a new communications module embodying the principles and concepts of an embodiment of the disclosure and generally designated by the reference numeral 10 will be described.

As best illustrated in FIGS. 1 through 2, the selectively handsfree communications module 10 generally comprises a first switch 12 and a second switch 14. The first switch 12 is configured to be operationally engaged to a control panel 16 of a first radio 18 mounted in a first vehicle 20. The first radio 18 is equipped for selective two-way communication with one or both of a base station 22 and at least one second radio 24 positioned in a second vehicle. The second switch 14 is configured to be engaged to a floorboard 26 of the first vehicle 20 so that the second switch 14 is positioned to be actuated by a foot of an operator of the first vehicle 20. The second switch 14 is configured to be operationally engaged to the first radio 18.

The first switch 12 may comprise a toggle switch 28, which is engaged to the control panel 16 as shown in FIG. 1. The second switch 14 may comprise a plunger switch 30. The plunger switch 30 is engaged to the floorboard 26 between a brake pedal 32 and a sidewall 34 of the first vehicle 20 and thus is configured for selective depression by a left foot of the operator. The present invention anticipates the first switch 12 and the second switch 14 comprising other switching means, such as, but not limited to, slide switches, depressible buttons, and the like. The present invention also anticipates the first switch 12 and the second switch 14 being integral to the control panel 16 and the first vehicle 20, respectively.

Programming code 36, which is selectively positionable on a microprocessor 38 of the first radio 18, enables the microprocessor 38 to accept signals from the first switch 12 and the second switch 14. The first switch 12 is configured to be switched to signal the microprocessor 38 to operate the first radio 18 in a handsfree operational mode, wherein a microphone 40 and a transceiver 42 of the first radio 18 are actuated upon actuation of the second switch 14. The programming code 36 also enables the microprocessor 38 to connect the first radio 18 to the base station 22 upon a single depression of the plunger switch 30 and to connect the first radio 18 to the base station 22 and the at least one second radio 24 upon a second depression of the plunger switch 30.

In use, the selectively handsfree communications module 10 is anticipated to be of particular use to law enforcement officers who are routinely required to undertake high speed pursuits. In these pursuits, the officers are required to communicate parameters of the pursuit, such as speed, direction, location, and the like, to a base unit and, in many circumstances, to fellow law enforcement officers in one or more second vehicles. Prior art communications modules comprise handheld microphones with depressible switches. Thus, the law enforcement officer must remove one hand from the wheel to communicate using the first radio 18. Operating the first vehicle 20 with one hand on the wheel increases risk of a vehicular accident.

With the selectively handsfree communications module 10, the law enforcement officer simply toggles the toggle switch 28 upon initiating a high speed pursuit. The law enforcement officer then can selectively actuate the microphone 40 and the transceiver 42 by pressing the plunger switch 30—once to communicate with the base unit and twice to communicate with both the base unit and the fellow law enforcement officers is in the one or more second vehicles.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A selectively handsfree communications module comprising:
   a first switch configured to be operationally engaged to a control panel of a first radio mounted in a first vehicle, wherein the first radio is equipped for selective two-way communication with one or both of a base station and at least one second radio positioned in a second vehicle;
   a second switch configured to be engaged to a floorboard of the first vehicle, such that the second switch is positioned for being actuated by a foot of an operator of the first vehicle, the second switch being configured to be operationally engaged to the first radio and the first switch; and
   programming code selectively positionable on a microprocessor of the first radio enabling the microprocessor for accepting signals from the first switch and the second switch, wherein the first switch is configured for switching for signaling the microprocessor for operating the first radio in a handsfree operational mode by operation of the second switch, wherein a microphone and a transceiver of the first radio are actuated upon actuation of the second switch.

2. The selectively handsfree communications module of claim 1, wherein the first switch comprises a toggle switch engaged to the control panel.

3. The selectively handsfree communications module of claim 1, wherein the second switch comprises a plunger switch.

4. The selectively handsfree communications module of claim 3, wherein the plunger switch is engaged to the floorboard between a brake pedal and a sidewall of the first vehicle, wherein the plunger switch is configured for selective depression by a left foot of the operator.

5. The selectively handsfree communications module of claim 3, wherein the programming code enables the microprocessor for connecting the first radio to the base station upon a single depression of the plunger switch and for connecting the first radio to the base station and the at least one second radio upon a second depression of the plunger switch.

6. A selectively handsfree communications system comprising:
   a first vehicle;
   a first radio mounted in the first vehicle, the first radio comprising a microprocessor, a transceiver, and a control panel, the transceiver and the control panel being operationally engaged to the microprocessor, wherein the first radio is configured for selective two-way communication with one or both of a base station and at least one second radio positioned in a second vehicle;
   a first switch operationally engaged to the control panel;
   a second switch engaged to a floorboard of the first vehicle, the second switch being operationally engaged to the first radio and the first switch, wherein the second switch is positioned for being actuated by a foot of an operator of the first vehicle; and
   programming code selectively positionable on a microprocessor of the first radio enabling the microprocessor for accepting signals from the first switch and the second switch, wherein the first switch is configured for switching for signaling the microprocessor for operating the first radio in a handsfree operational mode by operation of the second switch, wherein a microphone and a transceiver of the first radio are actuated upon actuation of the second switch.

7. The selectively handsfree communications system of claim 6, wherein the first switch comprises a toggle switch engaged to the control panel.

8. The selectively handsfree communications system of claim 6, wherein the second switch comprises a plunger switch.

9. The selectively handsfree communications system of claim 8, wherein the plunger switch is engaged to the floorboard between a brake pedal and a sidewall of the first vehicle, wherein the plunger switch is configured for selective depression by a left foot of the operator.

10. The selectively handsfree communications system of claim 8, wherein the programming code enables the microprocessor for connecting the first radio to the base station upon a single depression of the plunger switch and for connecting the first radio to the base station and the at least one second radio upon a second depression of the plunger switch.

11. A selectively handsfree communications module comprising:
   a first switch configured to be operationally engaged to a control panel of a first radio mounted in a first vehicle, wherein the first radio is equipped for selective two-way communication with one or both of a base station and at least one second radio positioned in a second vehicle, the first switch comprising a toggle switch engaged to the control panel;
   a second switch configured to be engaged to a floorboard of the first vehicle, such that the second switch is positioned for being actuated by a foot of an operator of the first vehicle, the second switch being configured to be operationally engaged to the first radio and the first switch, the second switch comprising a plunger switch, the plunger switch being engaged to the floorboard between a brake pedal and a sidewall of the first vehicle, wherein the plunger switch is configured for selective depression by a left foot of the operator; and
   programming code selectively positionable on a microprocessor of the first radio enabling the microprocessor for accepting signals from the first switch and the second switch, wherein the first switch is configured for switching for signaling the microprocessor for operating the first radio in a handsfree operational mode by operation of the second switch, wherein a microphone and a transceiver of the first radio are actuated upon actuation of the second switch, the programming code enabling the microprocessor for connecting the first radio to the base station upon a single depression of the plunger switch and for connecting the first radio to the base station and the at least one second radio upon a second depression of the plunger switch.

* * * * *